(12) United States Patent
Shi

(10) Patent No.: US 10,422,978 B2
(45) Date of Patent: Sep. 24, 2019

(54) CAMERA LENS

(71) Applicant: Rongbao Shi, Shenzhen (CN)

(72) Inventor: Rongbao Shi, Shenzhen (CN)

(73) Assignee: AAC Technologies Pte. Ltd., Singapore (SG)

(\*) Notice: Subject to any disclaimer, the term of this patent is extended or adjusted under 35 U.S.C. 154(b) by 36 days.

(21) Appl. No.: 15/358,452

(22) Filed: Nov. 22, 2016

(65) Prior Publication Data
US 2018/0017763 A1   Jan. 18, 2018

(30) Foreign Application Priority Data

Jul. 18, 2016   (CN) .......................... 2016 1 0564680

(51) Int. Cl.
| | | |
|---|---|---|
| G02B 13/00 | (2006.01) | |
| G02B 5/00 | (2006.01) | |
| G02B 9/14 | (2006.01) | |
| G02B 27/00 | (2006.01) | |
| G02B 9/16 | (2006.01) | |
| G02B 13/02 | (2006.01) | |

(52) U.S. Cl.
CPC .......... *G02B 13/0035* (2013.01); *G02B 5/005* (2013.01); *G02B 9/14* (2013.01); *G02B 9/16* (2013.01); *G02B 27/0025* (2013.01); *G02B 13/02* (2013.01)

(58) Field of Classification Search
CPC ...... G02B 13/0035; G02B 5/005; G02B 9/14; G02B 27/0025
USPC ........................................................ 359/785
See application file for complete search history.

(56) References Cited

U.S. PATENT DOCUMENTS

2013/0155528 A1\* 6/2013 Tsai ................... G02B 13/0035
359/785

\* cited by examiner

*Primary Examiner* — Collin X Beatty
(74) *Attorney, Agent, or Firm* — IPro, PLLC; Na Xu

(57) ABSTRACT

A camera lens is disclosed. The camera lens includes, in an order from an object side to an image side, a first lens with a positive refractive power, a second lens with a negative refractive power, and a third lens with a positive refractive power. The camera lens further satisfies specific conditions.

10 Claims, 4 Drawing Sheets

CAMERA LENS

FIELD OF THE INVENTION

The present disclosure relates to a camera lens for a portable electronic device.

DESCRIPTION OF RELATED ART

In recent years, with the flourishing development of the miniaturized camera lens, the demand of micro imaging module is increasing gradually, however, the photosensitive components of the general camera lens includes the charge coupled component or complementary metal oxidized conductor component, with the fine development of the semiconductor manufacturing process, the pixel size of the photosensitive component is further miniaturized, plus, the existing electronic products tend to have the optimum functions, and become thin, short and small, therefore, the miniaturized camera lens with good imaging quality becomes the mainstream in current market.

The existing three-piece camera lens has developed more mature, from object side to image side it is configured with a first lens with a positive refractive power, a second lens with a negative refractive power and a third lens with a negative refractive power, and its image surface is designed as the plane, and the third lens is designed as a lens with negative refractive power in order to correct the curvature of field, however, this structure has certain limit in shortening total optical length. Meanwhile, the distribution of the refractive power and shapes of the first lens, the second lens and the third lens of the existing three-piece camera lens are not sufficient, so its sensitivity is not high to further correct the chromatic aberration etc., causing that it has ordinary optical performance.

Therefore, it is necessary to provide an improved camera lens to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of the present disclosure more apparent, the present disclosure is described in further detail together with the figures and the embodiment. It should be understood the specific embodiment described hereby is only to explain this disclosure, not intended to limit this disclosure.

Figure 1:
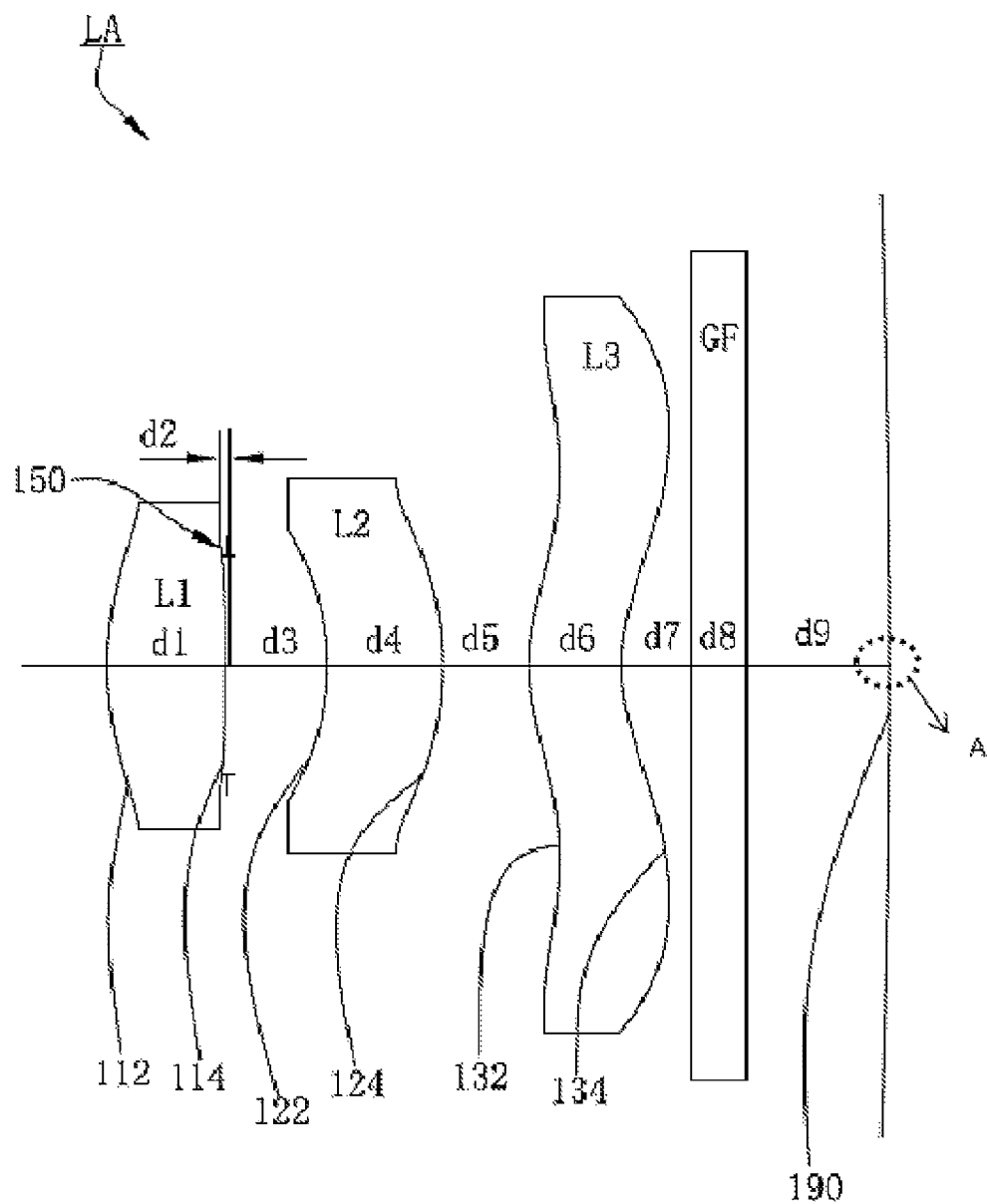
FIG. 1a is an illustration of a camera lens in accordance with an exemplary embodiment of the present disclosure.

Referring to FIG. 1, a camera lens LA in accordance with an exemplary embodiment of the present disclosure includes three pieces of lenses sharing the same axis, with a first lens L1, a second lens L2 and a third lens L3 arranged in an order from an object side to an image side. An aperture stop 150 is further arranged between the first lens L1 and the second lens L2. A glass plate GF is configured between the third lens L3 and the image surface 190.

In this embodiment, all the above three lenses are plastic lens, whose specific structures are as follows:

The first lens L1 is a positive lens, with a positive refractive power, whose object side surface 112 is convex, and image side surface 114 is convex. Both the object side surface 112 and image side surface 114 are aspheric surfaces, and there is an inflexion point set on the object side 112 of the first lens L1;

The second lens L2 is a negative lens, with a negative refractive power, whose object side surface 122 is concave, and image side surface 124 is convex. Both the object side surface 122 and image side surface 124 are aspheric surfaces, and there is an inflexion point set on the object side 124 of the second lens L2;

The third lens L3 is a positive lens, with a positive refractive power, whose object side surface 132 is convex, and image side surface 134 is concave. Both the object side surface 132 and image side surface 134 are aspheric surfaces, and the object side surface 132 of the third lens L3 is set with two inflexion points and one arrest point, and the image side 134 is set with one inflexion point and one arrest point;

The aperture stop 150 is set between the first lens L1 and the second lens L2, which is used for controlling the light entrance volume and controlling the depth of focus. The glass plate GF may be a glass cover piece or filter lens, and the filter lens can filter the light ray, whose types can be chosen according to actual need. It is also feasible if the glass plate GF is not set between the third lens L3 and the image surface 190.

The image surface 190 is the surface for object imaging, which is located at one side of the glass plate GF far away from the third lens L3. In this embodiment, the image surface 190 is pieced together by many arches of sub-image surfaces (191, 192, 193 ... 194) not in the same plane, and according to the optical axis of the camera lens LA they are set symmetrically, and the image surface 190 is designed like this to correct the curvature of field and improve its optical performance. Specifically speaking, the distance from two end points of the image surface to the position of the optical axis (from the top to the optical axis or from the bottom to the optical axis), the axial distance from the adjacent sub-image surfaces in different planes to the glass plate GF are increasing in turn, i.e. the distance from the sub-image surface distributed on the top and bottom to the glass plate on the axis is lower than the distance from the sub-image surface in the right middle to the glass plate GF on the axis, while the sub-image surface on the top and the sub-image surface on the bottom are set symmetrically.

In the camera lens provided by this invention, in order to realize the design requirements of camera lens LA as imaging with high resolution and long-focal distance, the first camera lens L1, the second camera lens L2 and the third lens L3 of the camera lens LA need to satisfy the following condition:

$$0.7 < f1/f < 0.9 \quad (1)$$

$$-5 < f2/f < -2.5 \quad (2)$$

$$1.6 < f3/f < 5.8 \quad (3)$$

where, f: Total focal length of the camera lens;
f1: Focal length of the first lens;
f2: Focal length of the second lens;
f3: Focal length of the third lens.

The conditions (1)-(3) stipulates the ratio between each of focuses of the first lens L1, the second lens L2 and the third lens L3 and the total focal length of the camera lens LA. It is hard to make the long-focus lens more miniaturized and clearer beyond conditions (1)-(3).

Meanwhile, in order to let the camera lens LA have the advantages including shorter optical length, lower sensitivity, higher sensibility, less pixel chromatic aberration and lower cost, it is better to design parameters of the first lens L1, the second lens L2 and the third lens L3 in the following scope:

[I: Focus]

In the whole structure of the camera lens LA, the focuses of the first lens L1, the second lens L2 and the third lens L3 of the camera lens LA need to meet the following conditions:

$$2.0 \text{ mm} < f1 < 3.0 \text{ mm};$$

$$-10 \text{ mm} \leq f2 < -8.5 \text{ mm};$$

$$8.5 \text{ mm} < f3 < 15 \text{ mm}.$$

[II: Refractive Power]

In the whole structure of the camera lens LA, the refractive power of the first lens L1, the second lens L2 and the third lens L3 of the camera lens LA need to meet the following conditions:

$$1.50 < n1 < 1.55;$$

$$1.60 < n2 < 1.70;$$

$$1.50 < n3 < 1.55;$$

where,
n1: Refractive power of the first lens;
n2: Refractive power of the second lens;
n3: The refractive power of the third lens.

[III: Abbe Number]

In the whole structure of the camera lens LA, the Abbe number of the first lens L1, the second lens L2 and the third lens L3 of the camera lens LA need to meet the following conditions:

$$40 < v1 < 60;$$

$$15 < v2 < 30;$$

$$40 < v3 < 60;$$

where,
v1: Abbe number of the first lens;
v2: Abbe number of the second lens;
v3: Abbe number of the third lens.

If the focuses, refractive powers and Abbe numbers of the first lens L1, the second lens L2 and the third lens L3 don't satisfy above conditions, the chromatic aberration characteristics and telocentric characteristics of the camera lens may be worsened, and the sensitivity of the camera lens LA will be increased, which make it hard to make the long-focus system of the camera lens LA miniaturized, and make it not good for reducing the cost of the camera lens LA.

In this disclosure, the first lens L1 is a positive lens bearing the main refractive power of the camera lens LA, which is good for reducing the total optical length. The second lens L2 uses the material with high refractive power and low Abbe number, for being capable of correcting the chromatic aberration of the system. Because three lenses of which the camera lens is composed have the composition and meet all the conditions, the camera lens LA manufactured has excellent optical characteristics, and f/TTL>0.75 long-focus system miniaturized, and FNo<2.5 high sensitivity, of which TTL is the distance from the object side surface of the first lens L1 to the image surface; FNo is the F value, i.e. ratio between the total focal length of the camera lens as a whole and the incident pupil diameter.

In the following, we will explain the camera lens LA in this invention by a specific embodiment. The symbols cited in the embodiment are shown as follows. The unit of the distance, radius and central thickness is mm.

f: Total focal length of the camera lens;
f1: Focal length of the first lens;
f2: Focal length of the second lens;
f3: Focal length of the third lens.
Fno: F value;
2ω: total angle of view;
S1: aperture stop;
R: curvature radius of the optical surface, when it is lens, it is central curvature radius;
R1: curvature radius of the object side surface of the first lens L1;
R2: curvature radius of the image side surface of the first lens L1;
R3: curvature radius of the object side surface of the second lens L2;
R4: curvature radius of the image side surface of the second lens L2;
R5: curvature radius of the object side surface of the third lens L3;
R6: curvature radius of the image side surface of the third lens L3;
R7: curvature radius of the object side surface of the glass plate (GF);
R8: curvature radius of the image side surface of the glass plate (GF);
d: central thickness of lenses or the distance between lenses
d1: the central thickness of the first lens L1;
d2: the axial distance between the image side surface of the first lens L1 and the aperture stop S1;
d3: the axial distance between the aperture stop S1 to the object side surface of the second lens L2;
d4: the central thickness of the second lens L2;
d5: the axial distance between the image side surface of the second lens L2 and the object side surface of the third lens L3;
d6: the central thickness of the third lens L3;
d7: the axial distance between the image side surface of the third lens L3 and the object side surface of the glass plate GF;
d8: the central thickness of the glass plate GF;
d9: the axial distance between the image side surface and the image surface of the glass plate GF;
nd: the refractive power of line d;
nd1: the refractive power of line d of the first lens L1;
nd2: the refractive power of line d of the second lens L2;
nd3: the refractive power of line d of the third lens L3;
nd4: the refractive power of line d of the glass plate GF;
v: Abbe number
v1: Abbe number of the first lens L1;
v2: Abbe number of the first lens L2;
v3: Abbe number of the first lens L3;
v4: Abbe number of the glass plate GF;
TTL: optical length (the axial distance from the object side surface of the first lens L1 to the imaging surface);

LB: the axial length from the image side surface of the third lens L3 to the imaging surface (including the thickness of the glass plate GF);

IH: image height $$y=(x2/R)/[1+\{1-(k+1)(x2/R2)\}1/2]+A4\times4+A6\times6+A8\times8+A10\times10+A12\times12+A14\times14+A16\times16 \quad (4)$$

wherein, R is the curvature radius on the axis, k is the cone coefficient, A4, A6, A8, A10, A12, A14 and A16 are aspheric coefficients.

The curvature radius R, central thicknesses of the lens or the distances between the lens d, the refractive power nd and Abbe numbers v of the object sides and image sides of the first lens L1~L3 of which the camera lens is composed in the embodiment 1 are shown in table 1. The cone coefficient k and aspheric coefficient are shown in the table 2. The values corresponding to the parameters stipulated by the conditions (1)~(3) and various values in the embodiment are listed in the table 3.

TABLE 1

| | R | d | | nd | | v | |
|---|---|---|---|---|---|---|---|
| R1 | 1.22155 | d1 = | 0.438 | nd1 | 1.5441 | v 1 | 56.10 |
| R2 | −19.97764 | d2 = | 0.010 | | | | |
| S1 | ∞ | d3 = | 0.368 | | | | |
| R3 | −1.00580 | d4 = | 0.426 | nd2 | 1.6398 | v 2 | 23.27 |
| R4 | −1.40181 | d5 = | 0.321 | | | | |
| R5 | 0.76022 | d6 = | 0.344 | nd3 | 1.5441 | v 3 | 56.10 |
| R6 | 0.71509 | d7 = | 0.255 | | | | |
| R7 | ∞ | d8 = | 0.210 | nd4 | 1.5168 | v 4 | 56.17 |
| R8 | ∞ | d9 = | 0.530 | | | | |

TABLE 2

| | cone coefficient | aspheric coefficient | | | | | | |
|---|---|---|---|---|---|---|---|---|
| | k | A4 | A6 | A8 | A10 | A12 | A14 | A16 |
| R1 | −1.9422E+01 | 1.1708E+00 | −6.3940E+00 | 3.0929E+01 | −1.2541E+02 | 3.3424E+02 | −5.1755E+02 | 3.3648E+02 |
| R2 | 7.1461E+01 | −2.6386E−01 | −1.5460E+00 | 2.4915E+01 | −2.7240E+02 | 1.5562E+03 | −4.4848E+03 | 5.1349E+03 |
| R3 | 8.8254E−01 | −4.3400E−01 | 2.9404E+00 | −2.1440E+01 | 1.5940E+02 | −6.2045E+02 | 1.3535E+03 | −1.3360E+03 |
| R4 | −2.1236E+01 | −1.9134E+00 | 8.8152E+00 | −3.4941E+01 | 1.0978E+02 | −2.1757E+02 | 2.5071E+02 | −1.2783E+02 |
| R5 | −4.2382E+00 | −6.7362E−01 | 5.0868E−01 | 1.1691E−01 | −4.9000E−01 | 3.4520E−01 | −9.4615E−02 | 7.2669E−03 |
| R6 | −1.4632E+00 | −1.0810E+00 | 1.4832E+00 | −1.5239E+00 | 1.0849E+00 | −4.9808E−01 | 1.2788E−01 | −1.3492E−02 |

TABLE 3

| | Embodiment | Condition |
|---|---|---|
| f1/f | 0.94 | (1) |
| f2/f | −4.25 | (2) |
| f3/f | 5.79 | (3) |
| f1 | 2.12 | |
| f2 | −9.55 | |
| f3 | 13.02 | |
| f | 2.250 | |
| EFL/TTL | 0.78 | |
| Fno | 2.40 | |
| 2ω | 75.0 | |
| LB | 0.995 | |
| TTL | 2.903 | |

As shown in table 3, this embodiment meets the conditions (1)~(3).

Figure 2:
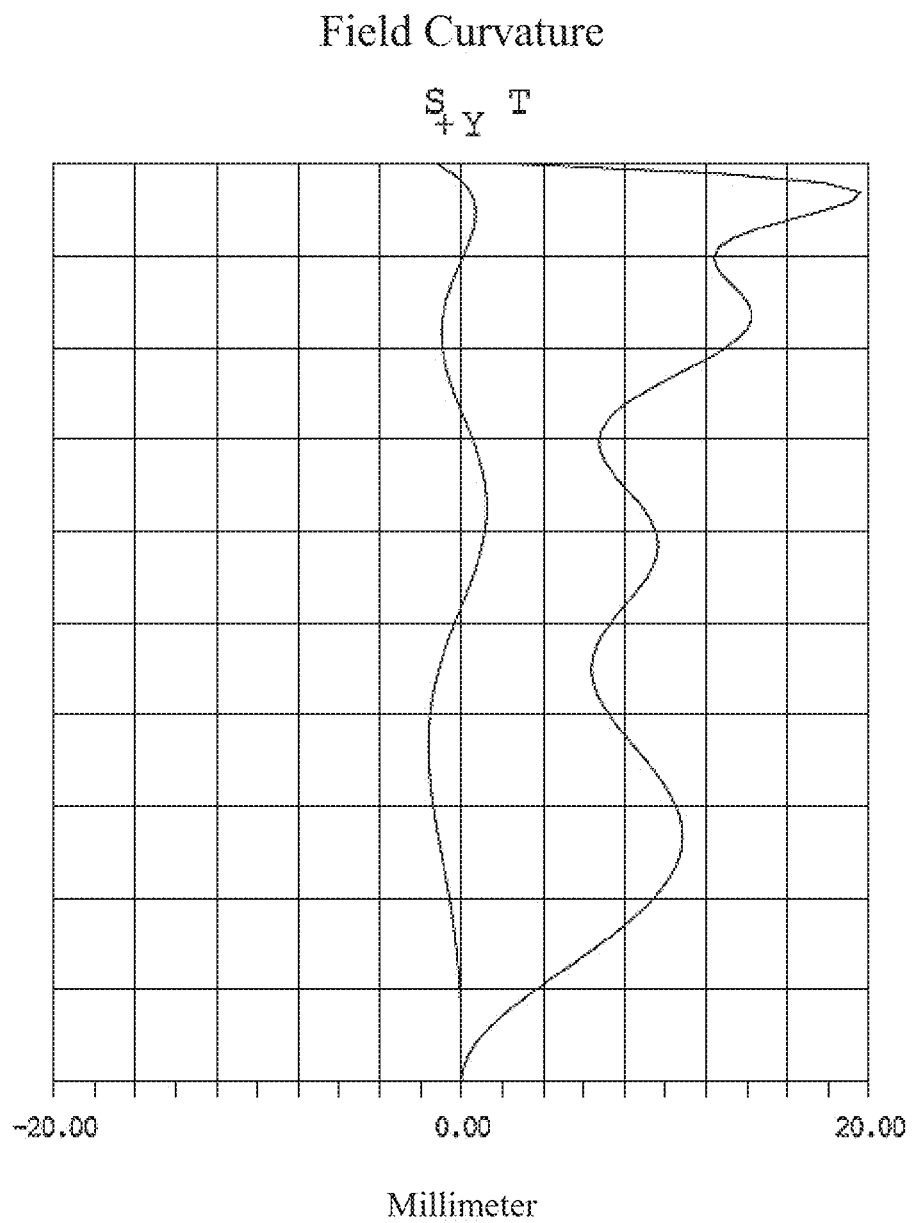
FIG. 2 is a diagram of Field Curvature of the camera lens.
Figure 3:
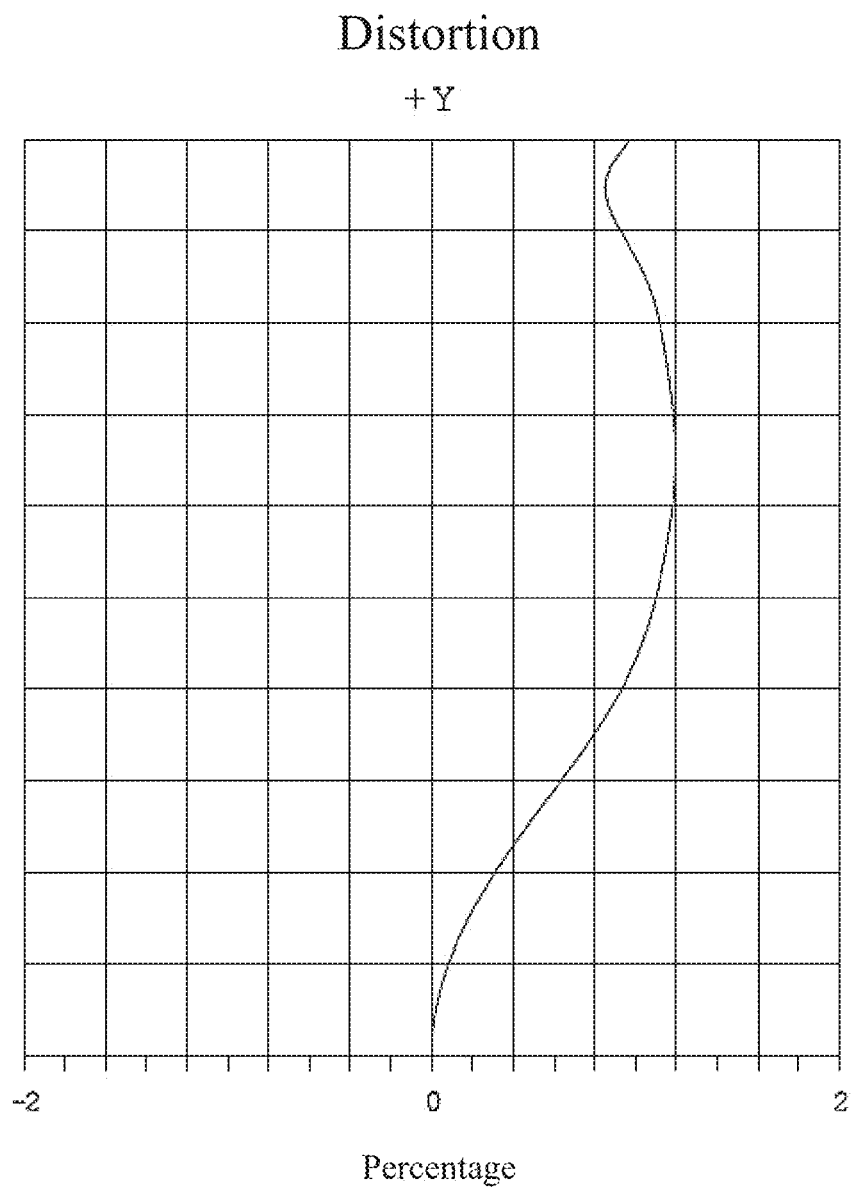
FIG. 3 is a diagram of Distortion of the camera lens.
Figure 4:
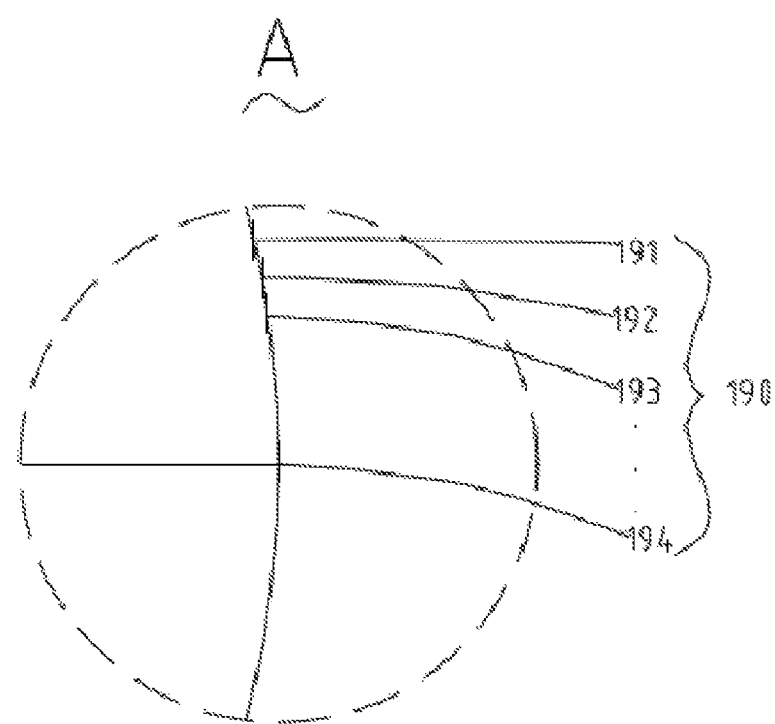
FIG. 4 is an enlarged view of A in FIG. 3.

Referring to FIGS. 2-3, the camera lens LA provided by this invention has higher optical performance.

The camera lens LA provided by this disclosure has the following helpful result:

(1) By optimizing the surface, distributing the focal power and choosing the optical material, this invention is designed with a long-focus camera lens LA having clear image that is suitable for miniaturized electronic equipment, and the first lens is a positive lens bearing the main focal power of the camera lens LA, which is capable of reducing the optical length efficiently; the second lens L2 uses the material with high refractive power and low Abbe number, capable of reducing the chromatic aberration of the camera lens LA efficiently; making the camera lens LA have the low sensitivity and high-luminous flux while acquiring high imaging performance, with the following excellent optical characteristics: 2ω=75°, f/TTL>0.75 the long-focus system miniaturized, and FNo<2.5 high sensibility;

(2) The image surface 190 is designed as a non-plane structure, which is pieced together by many arches of sub-image surfaces not in the same plane, and according to the optical axis of camera lens LA they are set symmetrically, capable of correcting the curvature of field and improving its optical performance.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens comprising, in an order from an object side to an image side:

a first lens with a positive refractive power;
a second lens with a negative refractive power;
a third lens with a positive refractive power; wherein the camera lens further satisfies the following conditions (1)~(3):

$$0.7<f1/f<0.9 \quad (1);$$

$$-5<f2/f<-2.5 \quad (2);$$

$$1.6<f3/f<5.8 \quad (3);$$

where, f is the total focal length of the camera lens;
f1 is the focal length of the first lens;
f2 is the focal length of the second lens;
f3 is the focal length of the third lens;
wherein the image surface is formed by a plurality of sub-image surfaces not in the same plane and symmetrical about the optical axis.

2. The camera lens as described in claim 1 further satisfying the following conditions (1a)~(3a):

$$2.0 \text{ mm}<f1<3.0 \text{ mm} \quad (1a);$$

$$-10 \text{ mm} < f2 < -8.5 \text{ mm} \quad (2a);$$

$$8.5 \text{ mm} < f3 < 15 \text{ mm} \quad (3a).$$

3. The camera lens as described in claim 1 further satisfying the following conditions (1b)~(3b):

$$1.50 < n1 < 1.55 \quad (1b);$$

$$1.60 < n2 < 1.70 \quad (2b);$$

$$1.50 < n3 < 1.55 \quad (3b);$$

where,
n1 is the refractive power of the first lens;
n2 is the refractive power of the second lens;
n3 is the refractive power of the third lens.

4. The camera lens as described in claim 1 further satisfying the following conditions (1c)~(3c):

$$40 < v1 < 60 \quad (1c);$$

$$15 < v2 < 30 \quad (2c);$$

$$40 < v3 < 60 \quad (3c);$$

where,
v1 is the Abbe number of the first lens;
v2 is the Abbe number of the second lens;
v3 is the Abbe number of the third lens.

5. The camera lens as described in claim 1, wherein the first lens has a focal length satisfying the condition: 2.0 mm<f1<3.0 mm.

6. The camera lens as described in claim 1, wherein the second lens satisfies the following conditions:

$$1.60 < n2 < 1.70;$$

$$15 < v2 < 30;$$

where,
n2 is the refractive power of the second lens;
v2 is the Abbe number of the second lens.

7. The camera lens as described in claim 1, wherein a ratio between the focal length of the camera lens and total optical length satisfies the following formula:

$$f/TTL > 0.75;$$

where,
f is the total focal length of the camera lens;
TTL is the axial distance between the object side surface of the first lens and image surface.

8. The camera lens as described in claim 1 further satisfying the following condition FNo<2.5, where, FNo is the ratio between the focal length of the camera lens as a whole and the incident pupil diameter.

9. The camera lens as described in claim 1 further including an aperture stop located between the first lens and the second lens.

10. The camera lens as described in claim 1, wherein the distances along directions parallel to the optical axis from the sub-image surfaces to center of the image surface increase from the center to outside.

\* \* \* \* \*